(12) United States Patent  (10) Patent No.: US 7,604,067 B1
Kornecki et al.  (45) Date of Patent: Oct. 20, 2009

(54) ROLLER SYSTEM FOR COVER CROP TERMINATION

(75) Inventors: Ted Stanley Kornecki, Auburn, AL (US); Randy L. Raper, Auburn, AL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 178 days.

(21) Appl. No.: 11/244,733

(22) Filed: Oct. 6, 2005

Related U.S. Application Data

(60) Provisional application No. 60/616,935, filed on Oct. 7, 2004.

(51) Int. Cl.
*A01B 49/02* (2006.01)
(52) U.S. Cl. .......................... 172/175; 172/69
(58) Field of Classification Search ............. 172/175, 172/180, 518
See application file for complete search history.

(56) References Cited

U.S. PATENT DOCUMENTS

| | | | | |
|---|---|---|---|---|
| 55,826 A * | 6/1866 | Custer | ................ | 172/180 |
| 540,872 A * | 6/1895 | Phillips | ................ | 172/545 |
| 639,697 A * | 12/1899 | Schwartz | ................ | 172/471 |
| 843,369 A * | 2/1907 | Schreiber | ................ | 172/177 |
| 879,253 A * | 2/1908 | French | ................ | 414/443 |
| 1,268,319 A * | 6/1918 | Burns | ................ | 172/500 |
| 1,332,921 A * | 3/1920 | Seaman | ................ | 171/98 |
| 1,377,073 A * | 5/1921 | Hobson | ................ | 172/540 |
| 1,488,302 A * | 3/1924 | Wagner | ................ | 172/537 |
| 1,596,334 A * | 8/1926 | Bullock | ................ | 172/393 |
| 1,609,231 A * | 11/1926 | Webb | ................ | 172/88 |
| 1,728,145 A * | 9/1929 | Watkins | ................ | 172/73 |
| 2,258,061 A * | 10/1941 | Krenzke | ................ | 172/256 |
| 2,493,649 A * | 1/1950 | Alloway | ................ | 172/572 |
| 2,587,406 A * | 2/1952 | Talbert | ................ | 56/246 |
| 3,718,190 A * | 2/1973 | Perlick | ................ | 172/173 |
| 3,991,830 A * | 11/1976 | Shepherd | ................ | 172/180 |
| 4,168,750 A * | 9/1979 | Combs | ................ | 172/311 |
| 4,208,151 A * | 6/1980 | Cross | ................ | 404/122 |
| 4,813,489 A * | 3/1989 | Just et al. | ................ | 172/175 |
| 4,947,770 A * | 8/1990 | Johnston | ................ | 111/121 |
| 5,531,171 A * | 7/1996 | Whitesel et al. | ................ | 111/121 |
| 6,968,907 B1 * | 11/2005 | Raper et al. | ................ | 172/518 |
| 2003/0056961 A1* | 3/2003 | Jones | ................ | 172/371 |

OTHER PUBLICATIONS

U.S. Appl. No. 10/747,459, "Smooth Rolling Cover Crop Roller", filed Dec. 29, 2003, Raper et al.

"Transplanter and Stalk-Chopper Modifications", *Committe for Sustainable Farm Publishing*, 2 pages, 1998.

(Continued)

*Primary Examiner*—Thomas B Will
*Assistant Examiner*—Joel F Mitchell
(74) *Attorney, Agent, or Firm*—John D. Fado; Robert Jones

(57) ABSTRACT

A cover crop termination system includes a smooth drum and a crimping arm assembly operatively connected to the drum through a cam mechanism including a cam follower. The crimping arm assembly includes a plurality of crimping assemblies having crimping bars which crimp the cover crop after it has been rolled in order to prevent resprouting of the crop.

20 Claims, 21 Drawing Sheets
(4 of 21 Drawing Sheet(s) Filed in Color)

OTHER PUBLICATIONS

Raper, R.L., et al., "Tillage Depth, Tillage Timing, and Cover Crop Effects on Cotton Yield, Soil Strength, and Tillage Energy Requirements", *Applied Engineering in Agriculture*, vol. 16(4), pp. 379-385, 2000.

*CTIC National Crop Residue Management Survey*, "1990-2002 Conservation Tillage Trends", 2002.

Price, A.J., et al., "Improved Roller Technology for cover Crop Management", *II World Congress on Conservation Agriculture*, Article.

Kornecki, T.S., et al., "Improving Rollers for an Alternative Cover Crop Kill Method", *USDA-ARS-NSDL Conservation Systems Projects*, Research Project Description 31, Sep. 23, 2004.

Boquet, D.J. and G.A. Breitenbeck, 2000. "Soil Amendments to Increase Cotton Productivity on Drough-Stressed Soils", pp. 80-87. In P.K. Bollich (ed) Proceedings of the $23^{rd}$ Annual southern Conservation Tillage Conference for Sustainable Agriculture. Monroe, LA. Jun. 19-21.

Kornecki, T.S., et al., "Effectiveness in Terminating Cover Crops Using Different Roller Implements", *26Southern Conservation Tillage Conference*, presented Jun. 6, 2004.

Raper, R.L., et al., "Reducing Soil Compaction of Tennessee Valley Soils in Conservation Tillage Systems", *J. Cotton Science*, vol. 4, pp. 84-90, 2000.

* cited by examiner

ROLLER SYSTEM FOR COVER CROP TERMINATION

CROSS-REFERENCE TO RELATED APPLICATIONS

This application is a non-provisional application claiming benefit to provisional application 60/616,935 filed Oct. 7, 2004.

BACKGROUND OF THE INVENTION

1. Field of the Invention

The present invention relates to a novel system and method for terminating cover crops by rolling and crimping.

2. Description of the Related Art

Cover crops are a vital part of conservation tillage systems, but they have to be managed appropriately to get their full benefit. This includes improved soil physical properties and mulch effects, increased soil organic matter, and reduced weed pressure caused by alleopathy. In the Southern United States, rye is commonly used as a winter cover crop. Timely termination of cover crops before a cash crop planting provides maximum benefits to the main crop. Mechanical rollers have been used in some conservation systems but high vibrations and low operating speeds associated with the current roller designs have resulted in a low rate of adoption by farmers.

A report by Conservation Tillage Information Center (CTIC) (Conservation Tillage Trends, 1990-2002, National Crop Residue Management Survey, 2003) shows that between 1990 and 2002, the number of United States cropland acres planted in conservation systems without surface tillage increased from 73.2 million acres to 103.1 million acres. This significant increase can be attributed by positive benefits of winter cover crops as an integral component of conservation tillage systems. Several studies have identified these benefits, such as increased water infiltration, reduced runoff, reduced soil erosion, and reduced detrimental effects of soil compaction (Reeves, In. J. L. Hatfield and B. A. Stewart (ed.), Advances In Soil Science: Crops Residue Management, Lewis Publishers, Boca Raton, Fla., 1994; Raper et al., Applied Eng. Agric, Volume 16 (4), 379-385, 2000a; Raper et al., J. Cotton Sci., Volume 4(2), 84-90, 2000b).

Most agricultural extension services recommend terminating the cover crop at least two weeks prior to planting a cash crop. This should prevent the cover crop from using valuable spring moisture that could be used by the main cash crop after planting. Killing cover crops has been accomplished by several methods with the use of herbicides as the main method, since spraying is relatively fast and inexpensive. However, planting after a chemical kill can sometimes be difficult if the cover crop has been allowed to become too large and lodged in multiple directions. This may hamper the ability of a planter with conservation tillage attachments from being successful in moving or cutting the residue and placing the seed properly in a soil furrow.

Another method that has been used to terminate the cover crop is mowing. This option may also pose problems because cover crops can sometimes re-sprout and compete with the cash crop for available moisture and nutrients. Also, the unattached crop residue can make the planting operation difficult as row cleaners can become clogged with loose residue and require frequent cleaning.

Flattening and crimping cover crops by mechanical rollers is widely used in South America, especially Brazil, to successfully terminate cover crop without the need of using herbicides. Because of potential environmental and monetary benefits (no use of herbicides), this technology is now receiving increased interest in North America. Implements for this purpose are usually round drums with equally spaced blunt bars around the drums perimeter. As the device is rolled across the field, the bars crimp or crush the stalks of the cover crop, causing death of the plants. In this method, the purpose of the bars is to crimp or crush the stems and not to cut them. If stems are cut, the cover crop can re-sprout. Ashford and Reeves (American Journal of Alternative Agriculture, Volume 18(1), 37-45, 2003) investigated benefits of rolling a cover crop. They indicated that when rolling was conducted at the correct stage of plant growth, the roller was equally effective as chemical herbicides at terminated the cover crop. They also indicated that the power required for rolling was significantly reduced, as much as tenfold, compared to the amount of power required to mow. Another important aspect of rolling is that a flat mat of cover crop lies in the direction of travel allowing farmers to use planter-seeders operating in parallel or slightly off parallel to the rolled cover crop direction which has been successful in obtaining proper plant establishment.

Despite these advances, some North American producers have reported problems with these implements. The main complaint has been the excessive vibration that the rollers generate. Research has shown that vibrations generated by agricultural equipment have detrimental effects on an operator's health including increased heart rate, headache, stomach pain, and lower back pain, and from long exposure: spinal degeneration (Bovenzi, Semin Perinatol. 20: 38-53.1996; Toren et al., Applied Ergonomics 33:139-146.2002; Muzammil et al., Journal of Occupational Health. 46: 403-409, 2004). The most effective method of alleviating the vibration, but not desirable and not economical, has been to reduce travel speed. Most producers find this to be an unacceptable solution due to the much higher operating speeds (about 6.4 km/hour) that they were able to use to spray herbicides on their crops Raper et al., U.S. patent application Ser. No. 10/747,459, filed Dec. 12, 2003, disclose an apparatus that is rolled across a field at relatively high speed without excessive vibration. The apparatus includes a substantially cylindrical drum having a plurality of rows of outwardly extending crimping bars projecting from the drum. The bars can be wave-shaped, curved, substantially straight and discontinuous bars paired with a plurality of spaced apart outwardly extending rings.

While various methods and apparatus are used for terminating cover crops prior to planting a cash crop using a conservation system, there remains a need for systems and methods for terminating cash crops which prevent re-sprouting of the cover crop, do not interfere with the planting of a cash crop, and at least reduces the vibrations so that termination operations are not slowed down. The present invention provides a system for terminating a cover crop which is different from related art systems and solves some of the problems of the prior art.

SUMMARY OF THE INVENTION

It is, therefore, an object of the present invention to provide a cover crop termination system that will roll and crimp a cover crop.

Another object of the present invention is to provide a cover crop termination system that includes a smooth roller which flattens the cover crop in the direction of travel.

A still further object of the present invention is to provide a cover crop termination system that includes a smooth roller made from a steel drum having steel plates welded to the end of the drum to which a main shaft and ball bearings are attached.

Another object of the present invention is to provide a crimping bar that is operatively attached to the smooth roller to crimp the flattened cover crop.

A still further object of the present invention is to provide a crimping bar that includes 3-inch crimping sections that are independently attached to a crimping frame and preloaded by compression springs which allow the soil profile to be followed.

Another object of the present invention is to provide a cover crop termination system where the crimping force is adjustable to target different cover crops, different soil types, and different moisture conditions.

A still further object of the present invention is to provide a cover crop termination system that includes on either side of a smooth drum a cam follower and a cam mechanism wherein said follower and mechanism are operatively connected to crimping assemblies through a crimping arm assembly and two adjustable springs which operatively attach to an arm of a roller frame and to the crimping arm.

Another object of the present invention is to provide a method for terminating a cover crop including the steps of flattening a cover crop with a smooth drum followed by crimping of the cover crop with a crimping assembly that includes 3-inch crimping sections independently attached to a support wherein a crimping bar crimps the cover crop to prevent re-sprouting.

A further object of the present invention is to provide a method for terminating a cover crop by crimping the cover crop with a crimping bar that includes 3-inch crimping sections independently attached to a crimping frame and preloaded by compression springs to allow the soil profile to be followed.

Further objects and advantages of the present invention will become apparent from the following description.

BRIEF DESCRIPTION OF THE DRAWINGS

The patent or application filed contains at least one drawing executed in color. Copies of this patent or patent application publication with color drawings will be provided by the Office upon request and payment of the necessary fee.

FIG. 2a shows a roller with attached long straight blunt crimping bars. FIG. 2b shows a roller with attached curved blunt crimping bars. FIG. 2c shows System 10 with an oscillating crimping arm which has a blunt crimping bar 31.

FIG. 11a shows a prior art roller system with a roller having long straight bars. FIG. 11b shows one embodiment of system 10 of the present invention.

DETAILED DESCRIPTION OF THE INVENTION

Figure 1A:
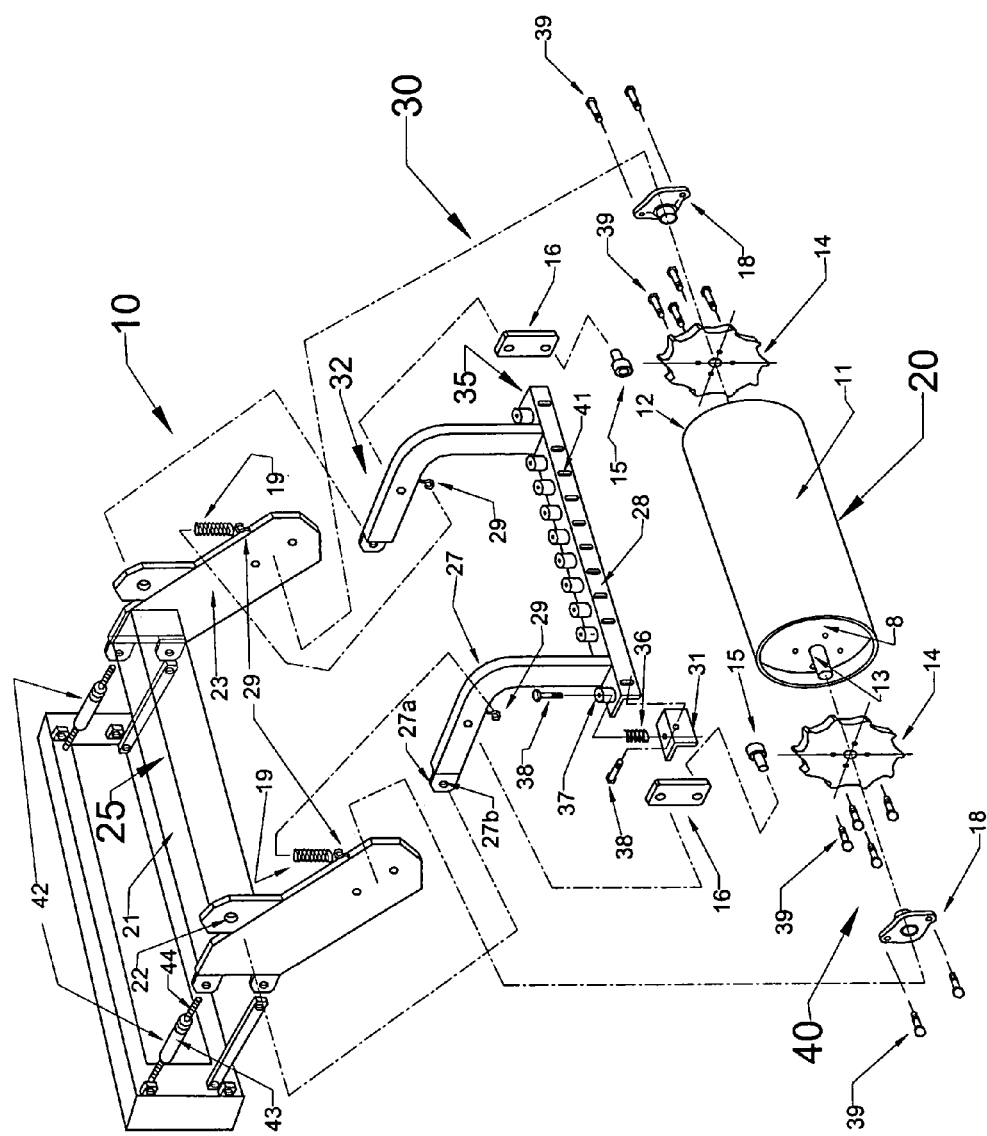
FIG. 1a is an exploded view of System 10 showing roller assembly 20 including drum 11, roller frame 21, pivot point 22, and side arms 23; cam assembly 40 showing cam mechanism 14 and cam follower 15; crimping assembly 30 showing crimping arm 27, crimping bar 31, and slide 28; and Spring assembly 35 showing springs 36, and spring housing 37; and parallel linkage arms 42 including turnbuckle 43 and linkages 44.

Referring to FIG. 1, a cover crop termination system 10 includes a roller assembly 20 and a crimping arm assembly 32 which are operatively connected through a cam mechanism 14 and an adjustable spring 19. Roller assembly 20 includes a drum 11, steel plates 8, shaft 13, ball bearings 18, cam assembly 40, roller frame assembly 25. Crimping arm assembly 32 includes two crimping arms 27, a plurality of crimping assemblies 30, slide 28, and 29.

Roller assembly 20 includes at least one rotating substantially cylindrical smooth drum 11, which is disposed to frictionally roll across the surface 5 (FIG. 1b) of a field to be treated. As defined herein, a substantially cylindrical drum 11 includes a cylinder having a circular cross-section taken normal to the axis. The cylinder may be constructed as a single unit (unitary) or it may be constructed from two or more shorter coaxial cylinders joined together. The size of drum 11 and its material of construction are not critical and may be selected by the user, although drums constructed from steel or iron and having diameters between approximately 16 inches and 24 inches and lengths between approximately 45 inches and 70 inches are generally preferred. The surface or face of the drum is solid (closed) and smooth. At each end of drum 11, two steel plates 8 are welded to the internal circumference. Main shaft 13 and ball bearings 18 are attached to plates 8. A commercial embodiment of the present invention would include a plurality of roller assemblies 20 of at least about 4.1 meters in length. In this embodiment, roller assembly 20 includes 3 individual drums 11: one middle section of about 1.8 meters (about 70 inches) long and two side drum 11 sections of about 1.15 meters (about 45 inches) long. Such configuration allows for compensation for non-uniform field surfaces. Operatively connected to Roller assembly 20 are two cam mechanisms 14 operatively connected to each drum end 12 through shaft 13 using bolts 39. Each mechanism 14 includes a cam follower 15 operatively connected to a connecting arm 16 which causes motion to crimping arm 27. With the changing location of cam followers 15 as they move from the highest to lowest points on the rotating cam mechanisms 14, the crimping bars 31 move up and down. The upper adjustable linkage of the parallel linkage was used to adjust the distance between the soil surface and crimping bars 31. Upper parallel linkage arms 42 are made up of a central turnbuckle 43 having threads (left and right thread) and two linkages 44. One linkage has a right external thread and the second linkage has a left external thread. Both arms are operatively engaged with the central turnbuckle 43. By way of example, the external right thread is engaged with the right internal thread in turnbuckle 43. When turnbuckle 43 is turned clockwise, linkage arm 42 is shortened and turning turnbuckle 43 counter clockwise allows linkage arm 42 to be lengthened. By shortening the upper linkage arms 42, the crimping arm assembly 32 is rotating away from soil surface 5 and increases the distance between the crimping bar 31 and soil surface 5 or the rolled cover crop. To provide equal crimping action and to account for non-uniform soil surface along the width of the roller, 3-inch crimping assemblies 30 are independently attached to crimping slide 28 and preloaded with compression springs 36 which allowed the soil profile to be followed.

Figure 1B:
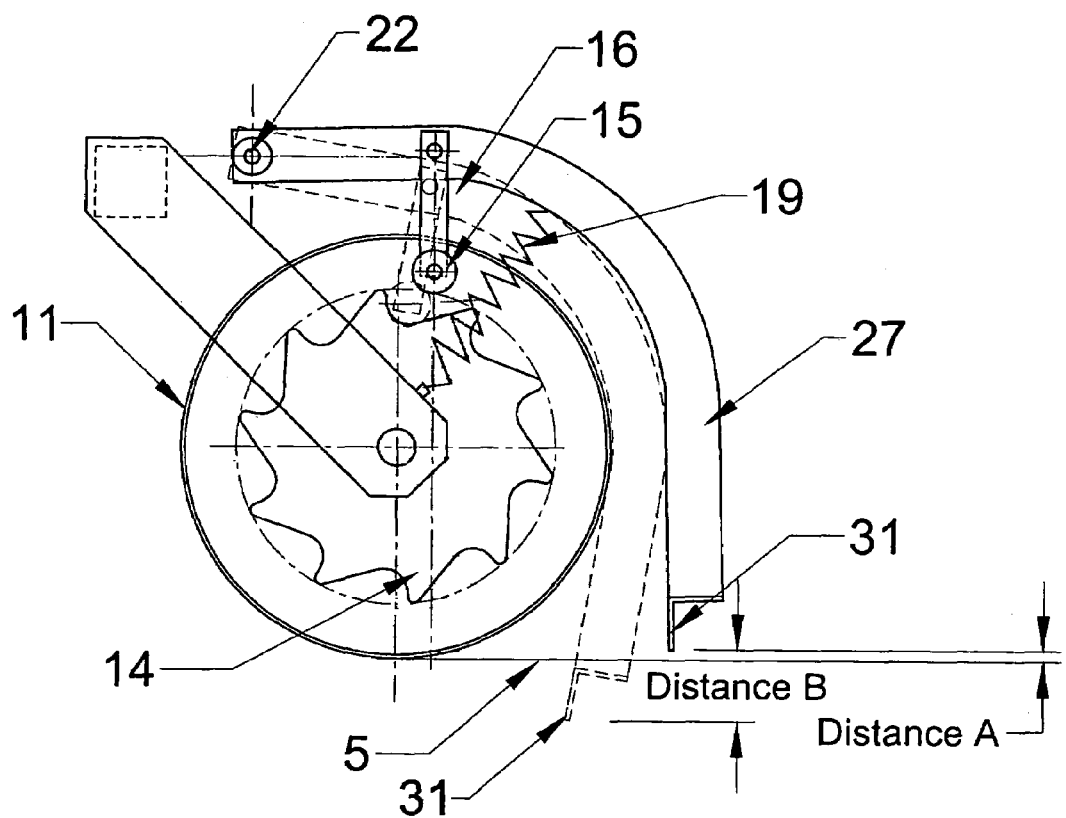
FIG. 1b is a side view of System 10 showing another embodiment of cam mechanism 14 and cam follower 15.

Drum 11 also includes two ball bearings 18 operatively connected to drum 11 through cam mechanism 14 onto shaft 13. Roller assembly 20 is operatively attached to roller frame assembly 25 by two ball bearings 18 and four bolts 39 (two bolts on each side arm 23. Roller frame assembly 25 includes roller frame 21, pivot point 22, side arms 23 which support bearings 18 and drum 11, means for adjusting crimping force such as for example springs 19 and hooks 29 to attach springs 19 to crimping arm 27. Means for adjusting crimping force, such as adjustable-springs 19, maintain the down force on cam mechanism 14 and provides continuous contact of the cam follower 15 with cam mechanism 14. The downward force can also be adjusted by adding weight to crimping arms 27. For crimping dense cover crops, cam mechanism 14 design can be used where the cam follower 15 does not have continuous contact with cam mechanism 14 where disengaging of the cam mechanism 14 allows all of the energy from the adjustable springs be used for crimping the cover crop before cam follower 15 engages again on cam mechanism 14 (FIG. 1b). This second embodiment of cam mechanism 14 provides a more aggressive crimping action since the cam mechanism allows for cam follower 15 to travel up and down greater distances without disengaging from the cam mechanism. However, since the distance A (FIG. 1b) from the tip of the crimping bar 31 to the rolled cover crop (i.e. ground surface) is smaller than that of the complete travel of the cam follower 15 allowed by cam mechanism 14 (Distance B, FIG. 1b), there is a momentary disengagement of cam follower 15 from cam mechanism 14. Since crimping arm 27 is spring loaded (spring 19), all stored energy from the spring is transferred to the cover crop before the next engagement of cam follower 15 with cam mechanism 14. Adjustment of springs 19 or any means for adjusting downward force is well within the ordinary skill in the art.

Crimping arm assembly 32 includes two crimping arms 27, a plurality of crimping assemblies 30, slide 28, and crimping arm assembly hook 29. Crimping arms 27 are made of any material suitable for the operation of assemblies 30, selection of which is within the ordinary skill in the art. Materials include, for example, steel and cast iron. Arms 27 are constructed of steel tubing of approximately 3×2³⁄₁₆ inches. Several triangular sections of material were removed from the internal surface of the tubing and the tubing was bent so that the cut edges from the removal of the triangular edges are in contact with each other. This forms an arm 27 that is bent at about 90 degrees to create a radius of about 15 inches for the internal surface to form about a 3 inch offset from drum 11 and about 18 inches of external surface for arm 27 with a radius length of about 22 inches. The top horizontal section of arm 27 is approximately 8 inches in length and the vertical section is about 12 inches in length. The top horizontal segment of arm 27 has an extension 27a attached to the outside side of the horizontal section of arm 27 that extends about three inches beyond arm 27 and has an opening for operatively removably attaching arms 27 to roller frame 21 at pivot point 22 using any removable fastening means such as a bolt, selection of which is within the ordinary skill in the art. Midway back from extension 27a, arm 27 has an opening 27b that extends through arm 27 for operatively attaching connecting arm 16 and cam follower 15 to said crimping arm assembly 32 using any fastening means, such as for example, a bolt and nut, a pin with washer, cutter pin, etc. On the bottom of the horizontal segment of arm 27, hanging perpendicular to the ground, is a hook 29 for receiving adjustable tension spring 19 to operatively attach roller frame 21 and crimping arm assembly 32. The vertical segment of arm 27 attaches to slide 28 using any means for permanently attaching such as welding, bolting, riveting, etc.

Slide 28 is a L-shaped support for attaching crimping assemblies 30. The length of slide 28 is dependent on the width of the roller or rollers of system 10. It is made of any suitable material for supporting crimping assemblies 30 such as, for example, steel or cast iron. The horizontal top section of slide 28 has openings (not shown), the size can be of any size or shape for allowing expansion and contraction of compression spring 36, determination of which is well within the ordinary skill in the art. These openings are spaced according to the number of crimping assemblies to be attached. For example, for three-inch crimping assemblies, the openings should be spaced about 3 inches apart. The vertical side of slide 28 has elongated openings 41 spaced in alignment with the compression spring openings and are of a size to receive a removable fastening means such as a bolt 38 for removably attaching crimping bar 31 to slide 28. Slide 28 is permanently attached to crimping arms 27 at the arms 27 base between the first two crimping assemblies 30 and the last two crimping assemblies 30 using any means for permanent attachment such as welding.

Figure 1C:
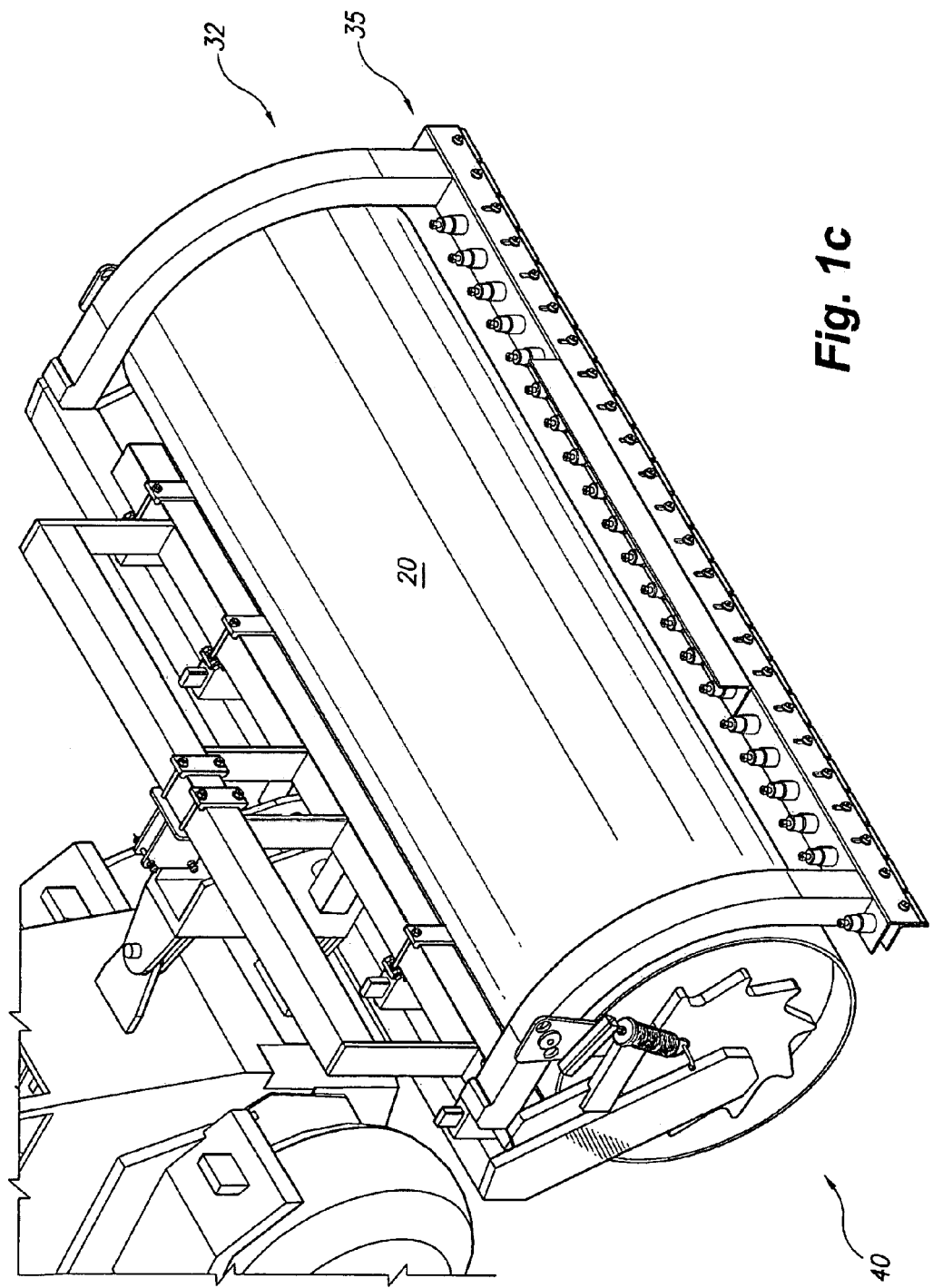
FIG. 1c is a front perspective view of the current invention.
Figure 1D:
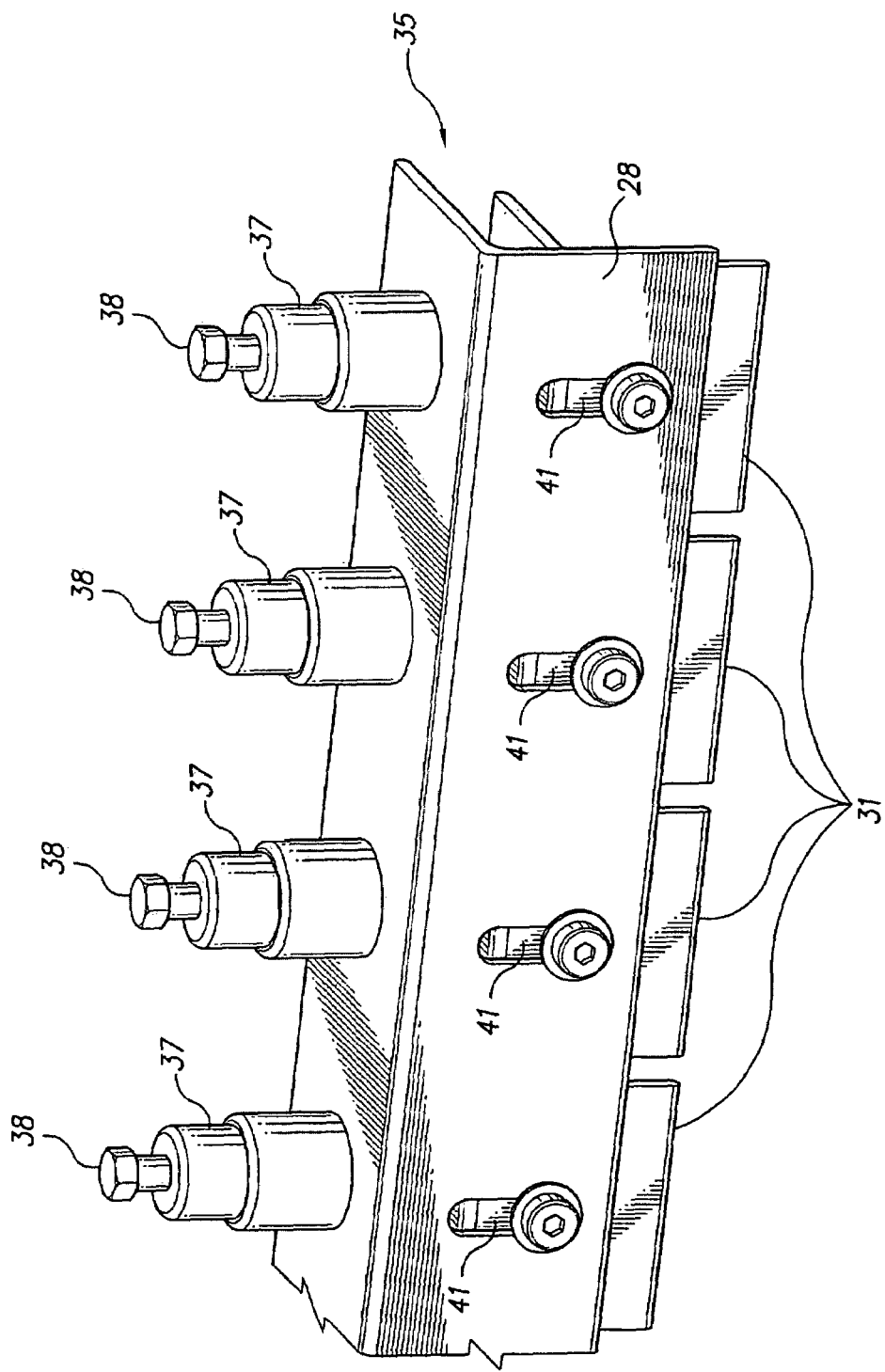
FIG. 1d is a front perspective view of a plurality of crimping assemblies.
Figure 1E:
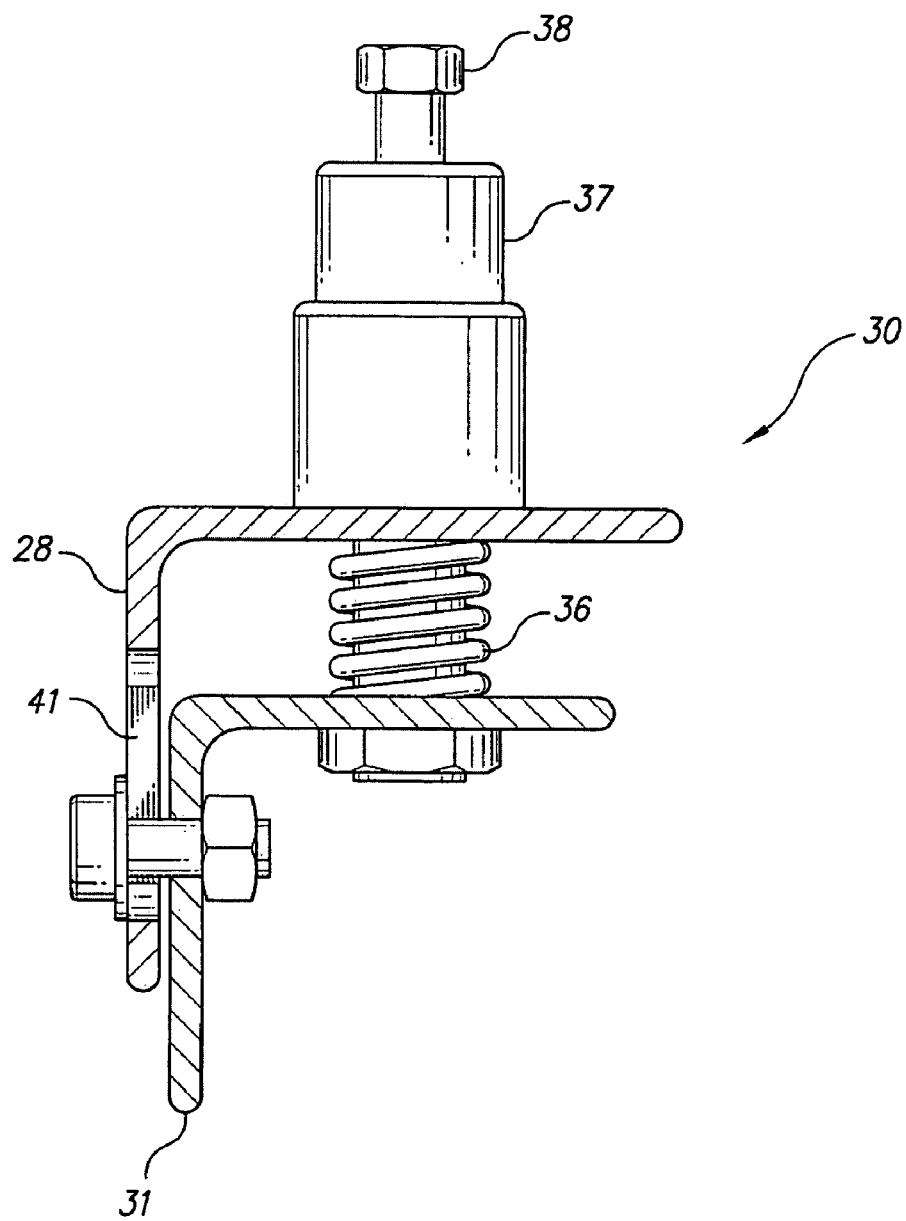
FIG. 1e is a partial sectional view of a crimping assembly.

As shown in FIG. 1c, in the preferred embodiment, the device 10 comprises a crimping means 35 for crimping a cover crop. As further shown in FIGS. 1d and 1e, the crimping means 35 includes a plurality of crimping assemblies 30 that are comprised of crimping bars 31, compression springs 36 and spring housings 37. Crimping bar 31 is an L-shaped blade of approximately 2½×2½×¼ inch angle iron. Bar 31 can be of any suitable material for withstanding down forces of system 10 for crimping plant material, so that it does no resprout. Steel angle iron is the preferred material. Bar 31 has an opening in the horizontal top segment for attaching spring housing 37 and an opening in its vertical segment for receiving a removable fastening means such as a bolt 38 to removably attach bar 31 to slide 28. Spring housing 37 is barrel-shaped with a hollow interior of approximately ¾ inch diameter and is approximately 1¼ inches long with an outside diameter of 1¼ inches. The top of housing 37 has an opening for receiving any removable fastening means such as a bolt 38 for removably attaching compression spring 36 to housing 37. Housing 37 is permanently attached to slide 28 by welding, for example. Compression spring 36 is removably held in place in housing 37 using any removable fastening means such as a threaded bolt 38.

System 10 is constructed as a field-going machine including a ground-traversing carriage or frame 21 for carrying above-mentioned drum 11. Frame 21 may be attached to any existing field going machine, such as a tractor, with a hitching means such as, for example, a three-point hitch which is used to lift and lower drum 11 to engage the field surface. In an alternative embodiment, system 10 may be constructed as part of a self-propelled machine having its own power source or engine. In this embodiment, one of ordinary skill in the art will recognize that system 10 should include suitable drive belts, gears, or other conventional drive mechanisms for connection between the power source and the moving components.

In operation, drum 11 frictionally rolls across plants as it is pulled by a tractor, providing rotation to cam mechanisms 14 attached to steel plates 8 of drum 11. As cam mechanisms 14 rotate, cam followers 15 and connecting arms 16 follow the surface of cam mechanism 14 and cause a lifting and lowering of crimping arm assembly 32 which rotates around pivot point 27b attached by two pins on frame 21 through holes 22. Consequently, up and down movement of crimping bars 31 provide crimping to the rolled cover crop plants. To compensate for non-uniform soil surface, crimping bars 31 can be lifted enough by compression springs 36 so that the crimping bars 31 follow the soil surface across the length of roller drum 11.

System 10 may be used for killing a cover crop such as prior to planting a desired cash crop. The time of use may be readily selected by the user, although optimal kill levels are achieved after the cover crop has matured and has a low moisture content, preferably at its soft-dough stage. At this stage, kill rates well over about 90% may be achieved. System 10 may also be used to roll and kill cover crops at earlier stages, such as at the anthesis stage or the flag-leaf stage, although kill rates are significantly reduced, particularly for the earlier flag-leaf stage. In all of these applications, system 10 is simply rolled over a cover crop. Under different soil types and moisture conditions, the crimping force can be adjusted with adjustable tension spring 19. System 10 may be used for rolling and killing a variety of cover crops, but is preferably used for the treatment of grasses, including but not limited to, sorghum, sudan grass, rye, wheat, etc.

Throughout this application, various publications are referenced. The disclosures of these publications in their entireties are hereby incorporated by reference into this application in order to more fully describe the state of the art to which this invention pertains.

The following examples are intended to further illustrate the invention and are not intended to limit the scope of the invention as defined by the claims.

EXAMPLE 1

Experiments were conducted at the Alabama Agricultural Experiment Station E. V. Smith Research Station on Compass sandy loam soil (thermic Plintic Paleudults) near Shorter, Ala. Before rolling the cover crop Rye, height, ten counts per plot, of rye was recorded. The study began when the cover crop was in the soft dough stage (Nelson et al., Growth Staging of wheat, barley, and wild oat, University of Missouri Extension Service, 1-20, 1995) which is a desirable growth stage for termination. Measurement of cover crop biomass was taken from approximately a 0.25 $m^2$ area within each plot. The average height of rye was approximately 1.2 m with the average dry mass of approximately 650 $g/m^2$ unit area. Rye injury (kill rates), based on visual desiccation, was estimated on a scale of 0 (no injury symptoms) to 100 (complete death of all plants) (Frans et al., N. D. Camper (ed.), Research Methods in Weed Science 3rd Ed., Southern Weed Sci. Soc., Champaign, Ill. 1986), and was evaluated on a weekly basis at one, two, and three weeks after rolling treatments.

Figure 2A:
FIGS. 2a-2c are photographs showing different roller system types.
Figure 2B:
Figure 2C:
Figure 2D:
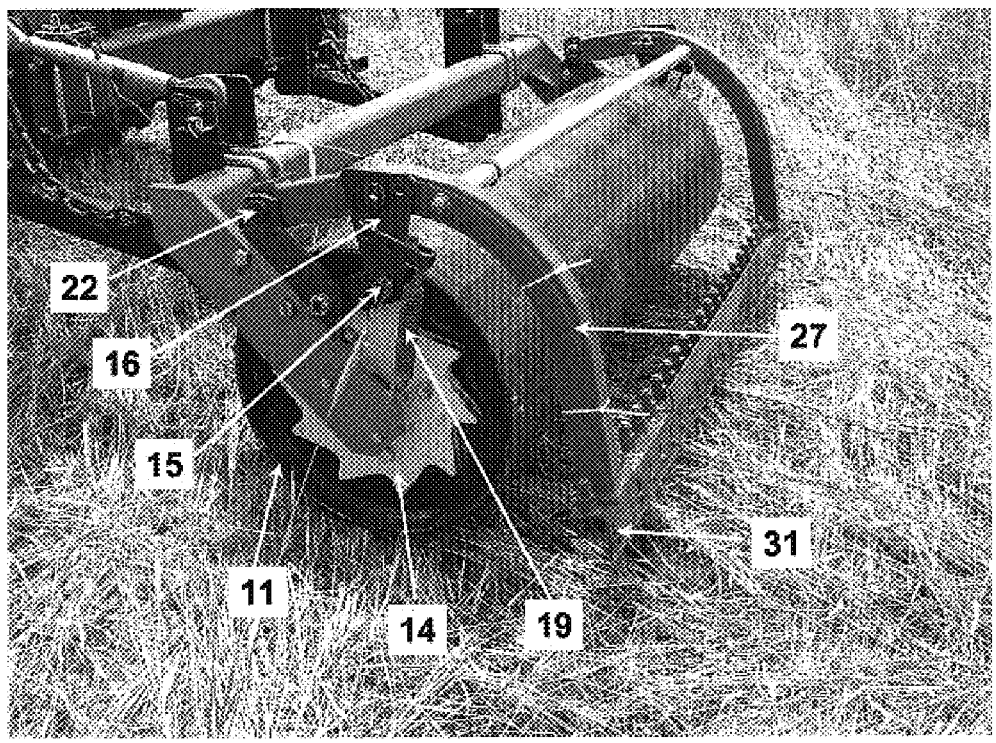
FIG. 2d shows a close up of system 10 with oscillating crimping arm 27, slide 28, crimping bars 31, elongated openings 41, roller assembly 20 including smooth drum 11, cam mechanism 14, cam follower 15, connecting arm 16, and adjustable tension spring 19.
Figure 3A:
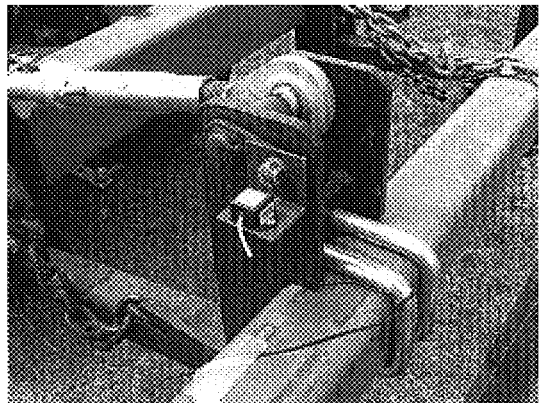
FIGS. 3a and 3b are photographs showing location of accelerometers mounted on roller frame 21 of System 10 (FIG. 3a) and on the tractor frame (FIG. 3b).
Figure 3B:
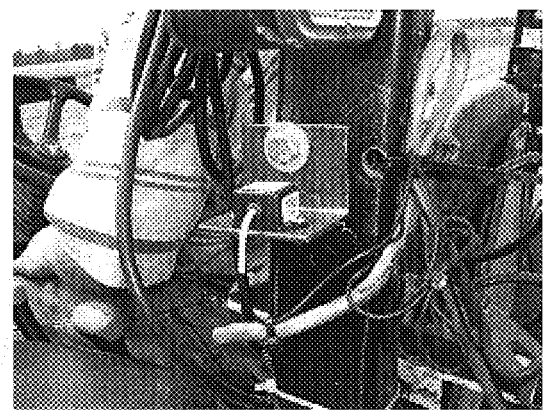

Three different roller designs of about a 5.8 ft single section width were used to determine performance of each roller design in terms of maximizing termination rate and minimizing vibrations while operating at optimal speed. A completely randomized block experiment was conducted with four replications comparing three crimper designs and three tractor speeds. Three different treatments of various roller designs were used: (1) long-straight bars (FIG. 2a, Bigham Brothers, Lubbock, Tex.; custom made to USDA specifications), (2) curved bars (U.S. patent application Ser. No. 10/747,459, supra) (FIG. 2b), and (3) System 10 having at least one smooth roller drum 11 and an oscillating crimping arm assembly 32 of a size to match the width of the smooth roller drum 11 (FIG. 2c). The operating speeds were setup to approximately 1, 3, and 5 miles per hour (mph). Accelerometers from Crossbow technology Inc. (San Jose, Calif.) were mounted on the roller systems' frames to measure vibrations due to roller motion (FIG. 3a) and on the tractor's frame to measure vibration levels to which the driver was subjected (FIG. 3b). The data were analyzed with SAS ANOVA Analyst Linear Model. A significance level of $P \leqq 0.1$ was chosen to separate treatment effects.

Figure 4:
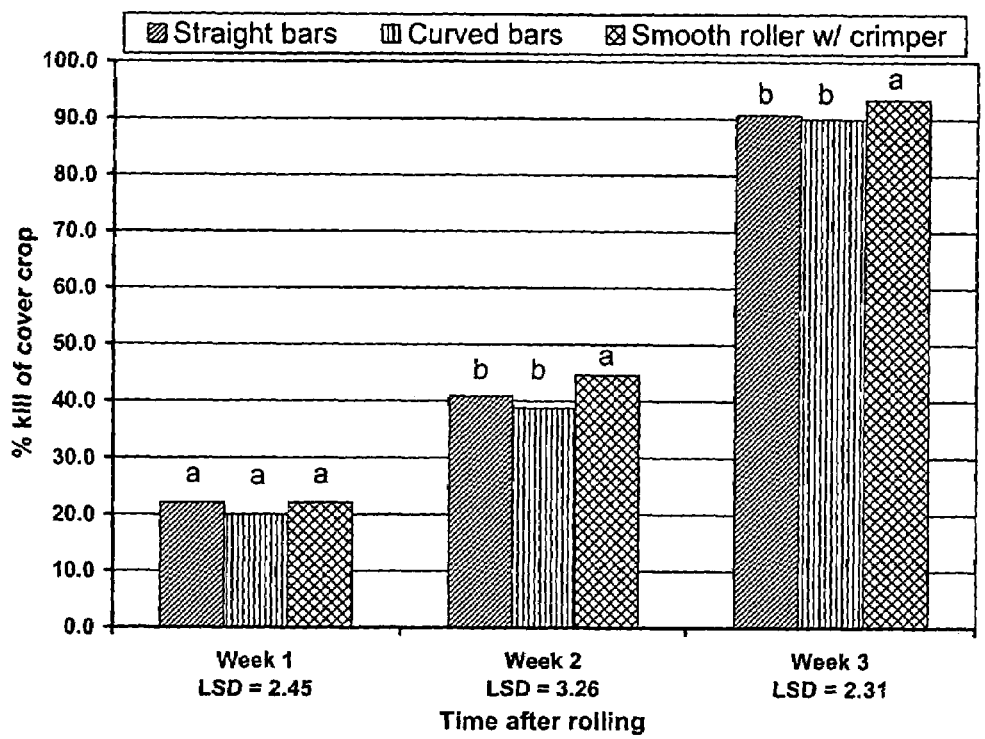
FIG. 4 is a graph showing the percent kill of a winter rye cover crop for different roller systems averaged over speeds for three weeks after rolling.

To compare effectiveness of each roller type, we averaged their termination rates over all speeds separately for each week (FIG. 4). Data have shown that after the first week of rolling there were no significant differences in termination rates between each roller, however straight roller and system 10 of the present invention with the smooth roller drum 11 and crimping arm assembly 32 produced higher kill rates (22%) in comparison with the curved bars roller (20%). After the second and the third week of rolling, system 10 of the present invention produced a significantly higher kill rate (44.5%) in comparison with straight bars (42%) and curved bars (38.7%)

roller there were significant differences in termination rates between roller types. System 10 of the present invention produced a significantly higher kill rate (44.5%) in comparison with other type rollers. Similarly, after the third week of rolling, system 10 of the present invention produced significantly higher kill rates (93.4%) in comparison with straight crimping bars (90.7%), and curved rollers (90%) (FIG. 4).

Figure 5:
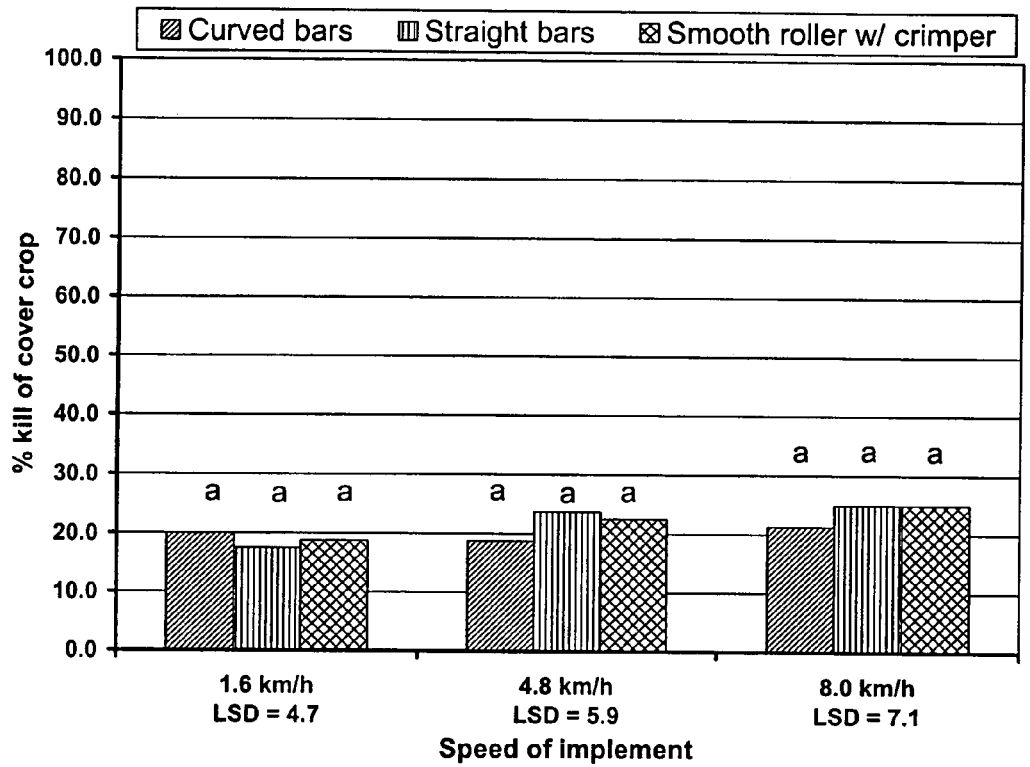
FIG. 5 is a graph showing percent kill of a winter rye cover crop for three different speeds and roller systems after first week from rolling.
Figure 6:
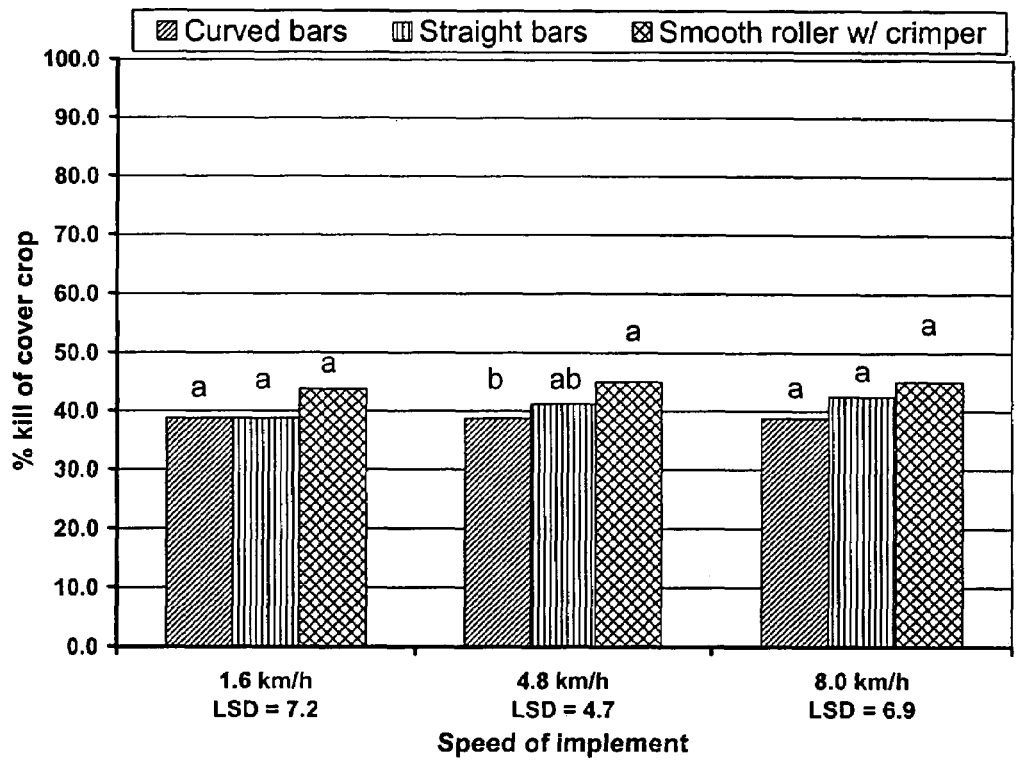
FIG. 6 is a graph showing percent kill of a winter rye cover crop for three different speeds and roller systems after two weeks from rolling.
Figure 7:
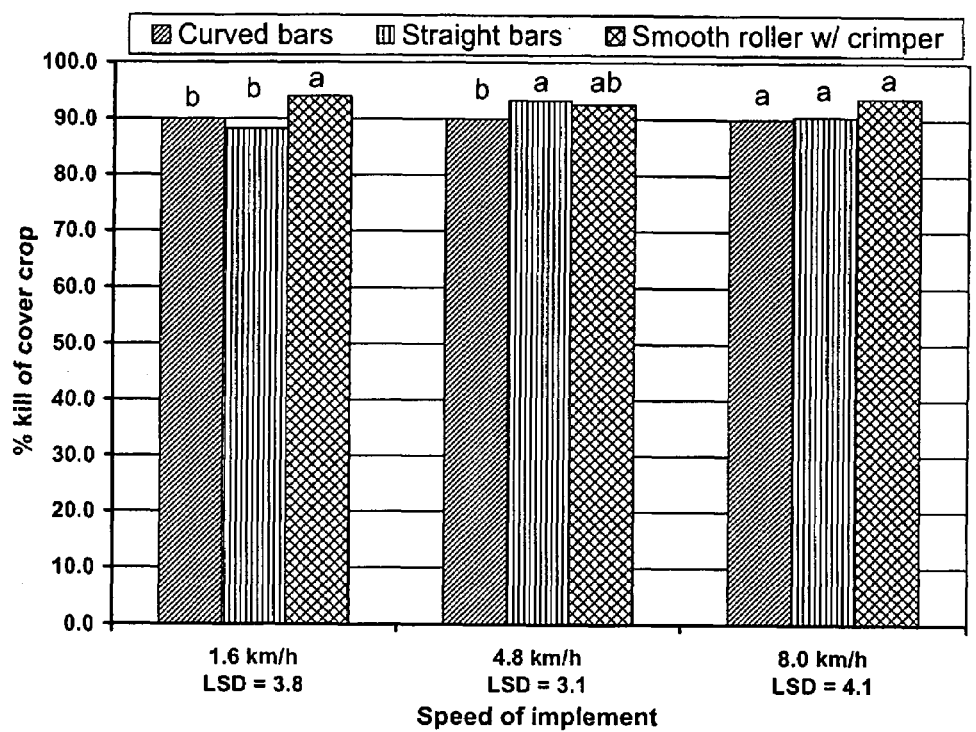
FIG. 7 is a graph showing percent kill of a winter rye cover crop for three different speeds and roller systems after three weeks from rolling.

To determine if the increase in operating speed had an effect in kill rates for the particular roller, data were analyzed for each roller type separately, and weekly for the three weeks of testing period. After the first week from rolling, no significant differences in kill rates were found between roller types at all operating speeds, however with increasing operating speed there was an increase in kill rates produced by straight-bars roller (about 25%) and system 10 of the present invention (about 25%) at about 8.0 km/h (FIG. 5). After two weeks from rolling, system of the present invention produced higher kill rates at all speeds in comparison with other type rollers. With increasing speed, there was an increase in kill rates for system of the present invention (about 45%) and straight bars roller (about 42.5%) at about 8.0 km/h (FIG. 6. Speed had no effect in increasing kill rates for curved bars roller (about 38.7%) (FIG. 6). After three weeks from rolling a significantly higher kill rate (about 94%) was found with system 10 of the present invention at about 1.6 km/h (FIG. 7). The increase of operating speed had no significant effect in increasing kill rates for all roller types that might be related to the natural and accelerated plant senescence as reported by Ashford and Reeves American Journal of Alternative Agriculture 18(1): 37-45 (2003).

Figure 8:
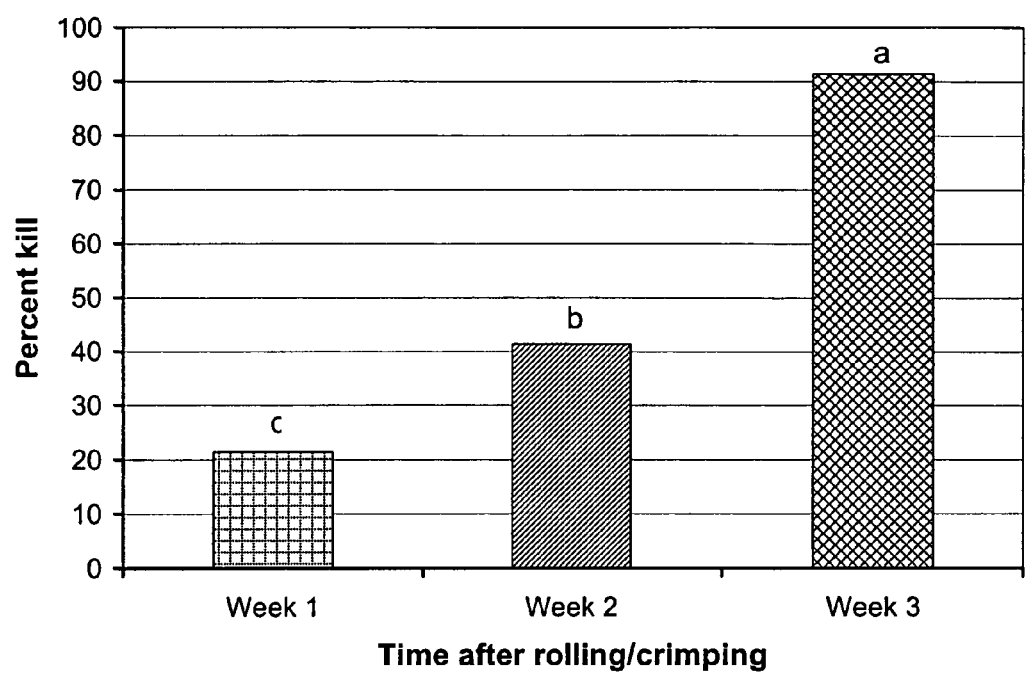
FIG. 8 is a graph showing overall kill rates after weeks elapsed from rolling/crimping. Similar letters indicate no significant differences between time treatments (at $\leq 0.1$).

Significant differences were found among the elapsed times from rolling/crimping. Kill rates were approximately 21%, 41% and 91% after the first, second and third week from rolling/crimping respectively (LSD=1.8%) Rollers initiate killing process of cover crops by rolling and crimping the crops. The termination process of the cover crops is not rapid and takes about 3 weeks to completely kill the plants. This is likely due to the natural senescence of the cover crop (FIG. 8)

Figure 9:
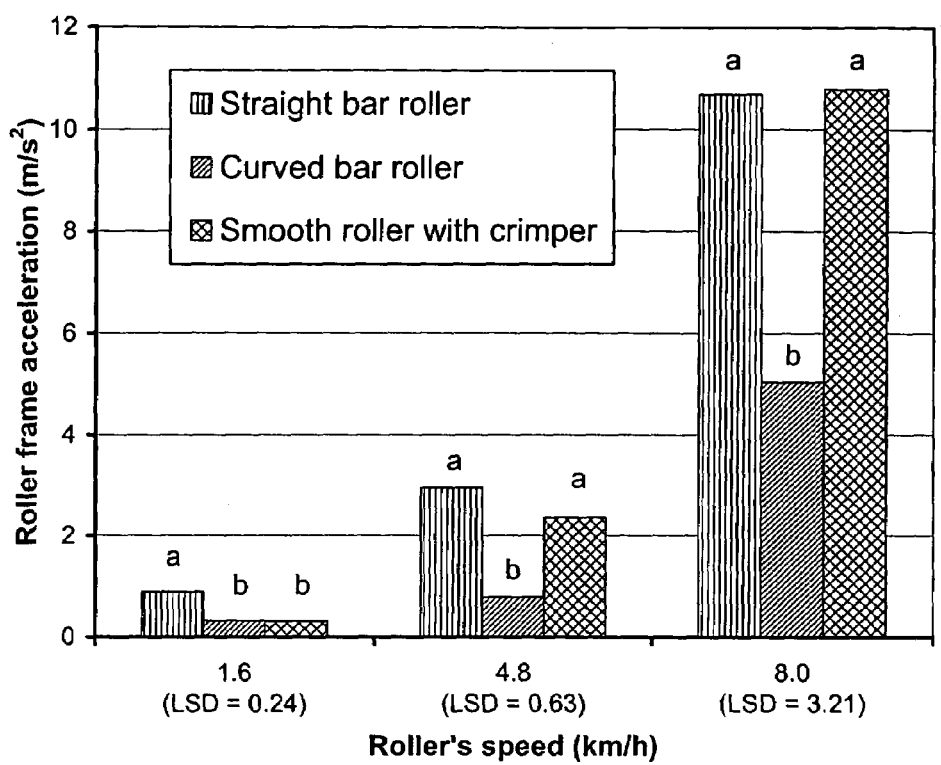
FIG. 9 is a graph showing roller frame vibration levels among three roller types at each operating speed. Similar letters indicate no significant differences between treatments ($\alpha \leq 0.1$).
Figure 10:
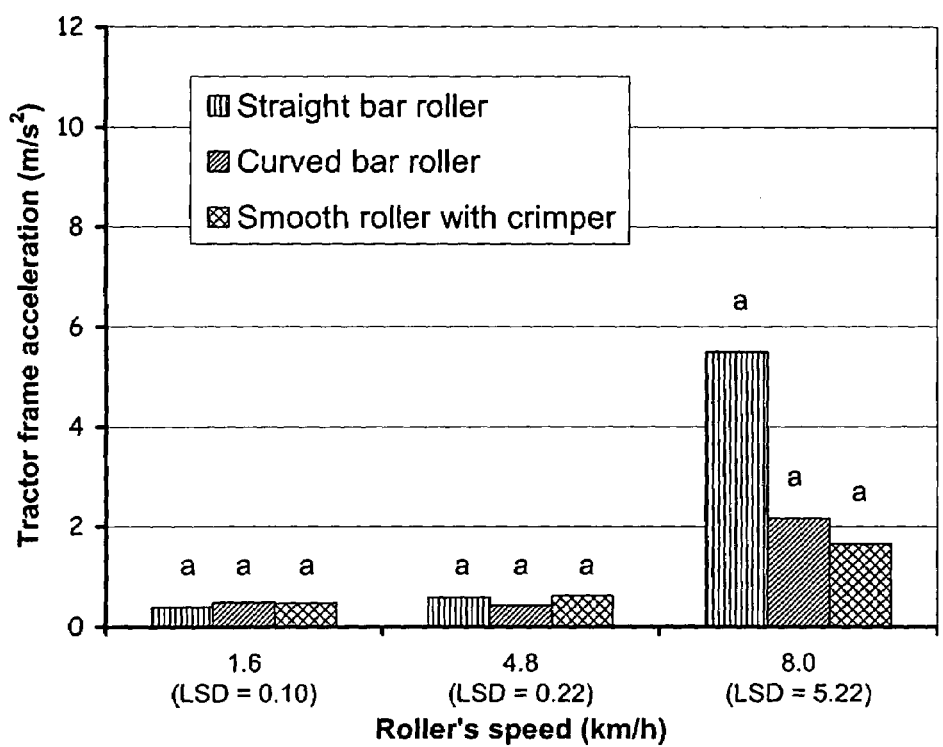
FIG. 10 is a graph showing tractor frame vibration levels among three roller types at each operating speed. Similar letters indicate no significant differences between treatments ($\alpha \leq 0.1$)

Vibration levels were measured for roller and tractor frames at three operating speeds. At 1.6 km/h, significantly higher vibration level was generated by the roller with straight crimping bars. At 4.8 km/h significantly higher vibration levels were generated by two rollers: the roller with straight bars and system of the present invention. At 8 km/h the magnitude of vibration levels generated by all rollers further increased, and similarly as at 4.8 km/h, significantly higher vibration levels were generated by the roller with straight bars and by system of the present invention. However, there were no significant differences in vibration levels measured on roller's frame between system of the present invention and the roller with straight bars (FIG. 9). There were no significant differences in vibration levels transferred to the tractor frame at three operating speeds for all three roller types. However, vibration increased with increasing speed, especially at 8.0 km/h. The highest magnitude in vibration levels recorded at 8.0 km/h for the roller with straight bars, and the lowest vibration level was found with system of the present invention (FIG. 10). Lower vibration levels transferred by system of the present invention to tractor's frame can be explained by the mounting location on the roller's frame two pivot points (bushings) for crimping bar oscillation. It appears that most of the energy from the oscillating crimping bar was transferred to a flat, rolled mat of cover crop; thus the cover crop acts as an effective vibration damper for the crimping bars.

According to International Standard Office (ISO, 1997) vibration limit of 2.0 m/s$^2$ classified as extremely uncomfortable vibration level. Australian Standards developed for 8 hours of human exposure to vibrations recommended a health limit (detrimental effect) of vibrations levels not higher than 0.63 m/s$^2$ (Mabbott, 2001, Australian Transport Safety Bureau. Report No. CR 203: pp 35). Vibration levels generated by the three rollers, at about 1.6 and about 4.8 km/hour did not exceed ISO and Australian limits (FIG. 10). Vibration level of 5.6 m/s$^2$ transferred to the tractor frame and operator at 8.0 km/h by the straight bar roller exceeded more than double limits outlined by International Standards Office. At 8.0 km/h all three roller types exceeded Australian limits, however, system of the present invention generated 1.8 m/sec$^2$ vibration levels on the tractor frame that was below the ISO 1997 "extremely uncomfortable limit". Roller with curved bars slightly exceeded that limit generating 2.1 m/sec$^2$ at 8.0 km/h. Low vibration levels transferred by System 10 to the tractor's frame can be explained by the mounting on the roller frame 21 of two pivot points 22 (bushings) for crimping oscillation. It appears that most of the energy from the oscillating crimping bar 31 was transferred to a flat, rolled mat of cover crop; thus the cover crop acts as an effective vibration damper from bar 31.

EXAMPLE 2

Figure 11A:
FIGS. 11a and 11b are photographs showing different commercial-sized roller systems.
Figure 11B:

Two different roller designs of approximately 4.1 m (commercial width) were used to determine termination rate and vibration levels for two operating speeds. A completely randomized block experiment was conducted with four replications. Two different treatments of roller designs were used: (1) long-straight bars and (2) System 10 with a smooth roller drum 11 and an oscillating crimping arm assembly 32. The first roller was a three-piece assembly (FIG. 11a) from Bigham Brother, Inc. (same as in Example 1, Lubbock, Tex.). The second roller system, System 10 of the present invention, includes a three-piece assembly smooth roller drum 11 and an oscillating crimping arm assembly 32 (FIG. 11b). The operating speeds were approximately 3.2 km/hour (2.0 mph) and 6.4 km/hour (4.0 mph). Speed of 6.4 mph was chosen to match speeds commonly used in field chemical applications. Rolling/crimping effectiveness by rollers was compared with a chemical burndown using Glyphosate (Roundup). Roundup was applied to a separate plot at the same time as rolling/crimping. As in Example 1 above, Crossbow accelerometers were mounted on the tractor's frame to measure vibration levels to which the driver is subjected and on the roller's frame to measure vibration due to the roller's motion. Data were analyzed with SAS ANOVA Analyst's linear model. A significance level of P≦0.05 was chosen to separate treatment effects.

Figure 12:
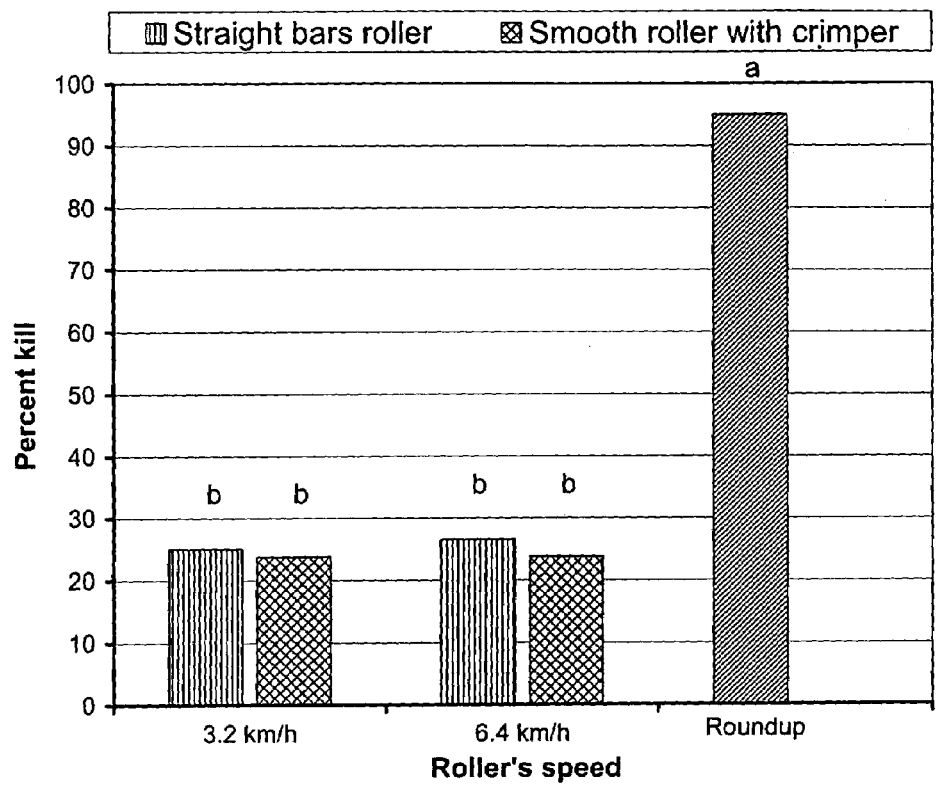
FIG. 12 is a graph showing average kill rates measured after one week from rolling/crimping for two three-section roller systems as compared with the use of the herbicide Glyphosate (Roundup). Similar letters indicate no significant differences between treatments ($\alpha \leq 0.1$).
Figure 13:
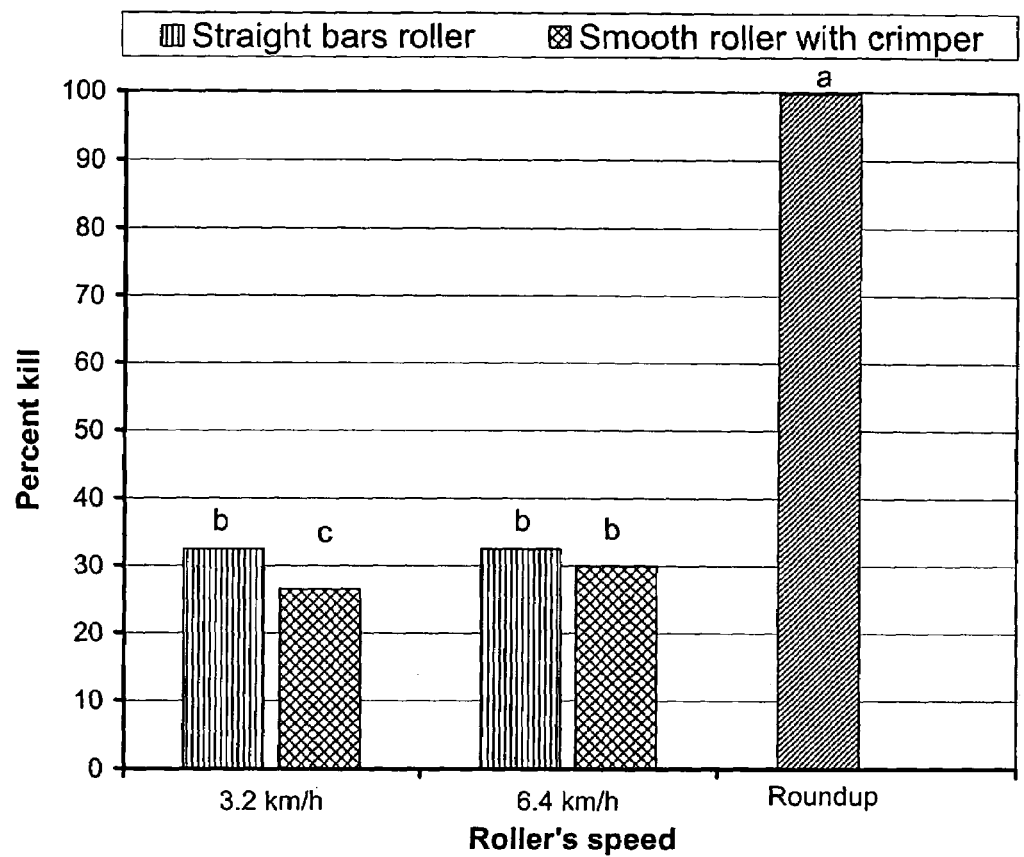
FIG. 13 is a graph showing average kill rates measured after two weeks from rolling/crimping for two three-section roller systems as compared with the use of the herbicide Glyphosate (Roundup). Similar letters indicate no significant differences between treatments ($\alpha \leq 0.1$).
Figure 14:
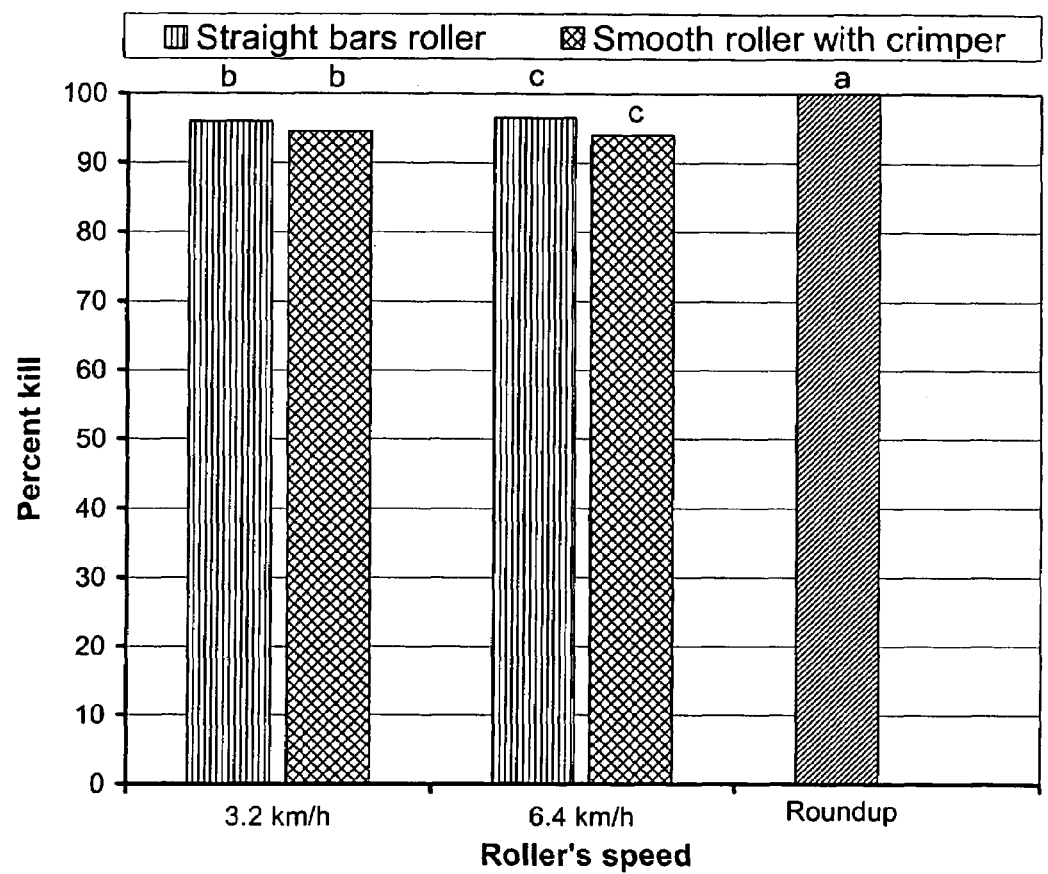
FIG. 14 is a graph showing average kill rates measured after three weeks from rolling/crimping for two three-section roller systems as compared to the use of the herbicide Glyphosate (Roundup). Similar letters indicate no significant differences between treatments ($\alpha \leq 0.1$).

Before rolling the rye cover crop, the height and biomass of the rye was measured. An average height of rye was about 1.7 m with an average dry mass of about 625 g/m$^2$ unit area. To determine cover crop termination effectiveness by rollers before planting cotton at about 3 weeks after rolling and crimping, the killing rates produced by the rollers and with a chemical burndown was compared. One week after rolling, no significant differences in kill rates were found between two rollers at both speeds (LSD=5.8%). At about 3.2 km/h, straight bars roller and system 10 of the present invention produced a killing rate of about 25% and about 24%, respectively. Similarly, at about 6.4 km/h, straight bars roller and system 10 of the present invention produced a killing rate of about 26% and about 24%, respectively. Kill rate produced by Glyphosate (Roundup) was about 95% (FIG. 12). Two weeks after rolling, no significant differences in kill rates were found between two rollers at about 6.4 km/h (LSD=3.4%). The increase in operating speed to about 6.4 km/h had an effect in producing higher kill rate of about 30% by system 10 of the present invention; at about 3.2 km/h, a kill rate of about 26.5% was recorded. The increase in operating speed did not affect kill rates produced by straight bars roller (about 32%). Kill rate of about 99% was recorded for Roundup (FIG. 13). Three weeks after rolling a significantly higher kill rate for rye (LSD=1.2%) was recorded for the roller with long straight bars: about 96% at about 3.2 km/h and about 96.5% at about 6.4 km/h in comparison with system 10 of the present invention (about 94% at about 3.2 km/h and about 94.5% at about 6.4 km/h the smooth roller with crimping bar. Significantly higher kill rate of 100% was recorded for Roundup in comparison with kill rates recorded for two roller types (FIG. 14). Despite these differences, from a practical standpoint at cotton planting time after three weeks from rolling, both rollers effectively terminated the cover crop exceeding 94% kill rate without the need for chemical application which is especially important due to reduced cost and enhanced environmental protection. Studies conducted by Ashford and Reeves, American Journal of Alternative Agriculture 18(1): 37-45 (2003) showed similar results with respect to termination rates after 3 weeks. They also stated that when kill rates of the cover crop were above 90% before planting, no chemical treatment was needed.

Lower killing rates of about 94% produced by the system 10 of present invention in comparison with Straight long bars roller (about 96%) could be attributed to the lower velocity of the oscillating crimping arm at lower operating speed of System 10, thus transferring a lower energy level to crimp the cover crop at higher soil moisture condition (softer soil) caused by a rainfall before conducting three-section rollers experiment. Another reason System 10 showed reduced killing rates, when compared to the straight long bars roller, was that it had incomplete roller contact with the ground across the width of the implement. This insufficient contact was caused by depressions created by tractor tires to the soft soil surface, which reduced contact by crimping arm 27 against the rolled cover crop. Higher killing rates produced by long straight bars were most likely due to the higher pressure from long bars which resulted in deeper blade penetration in the soil, thus nearly eliminating empty pockets between tire depressions and crimping surfaces of crimping bars 27.

Figure 15:
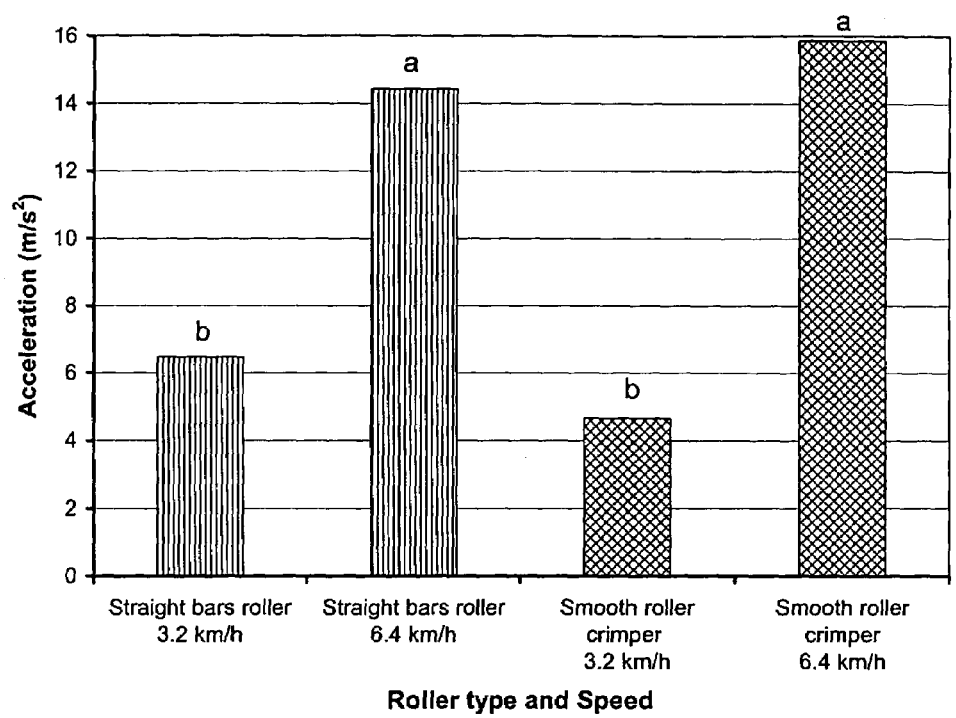
FIG. 15 is a graph showing vibration levels measured on the roller's frame for a roller system with straight bars and System 10 of the present invention at speeds of 3.2 km/hour and 6.4 km/hour. Similar letters indicate no significant differences between treatments ($\alpha \leq 0.1$).
Figure 16:
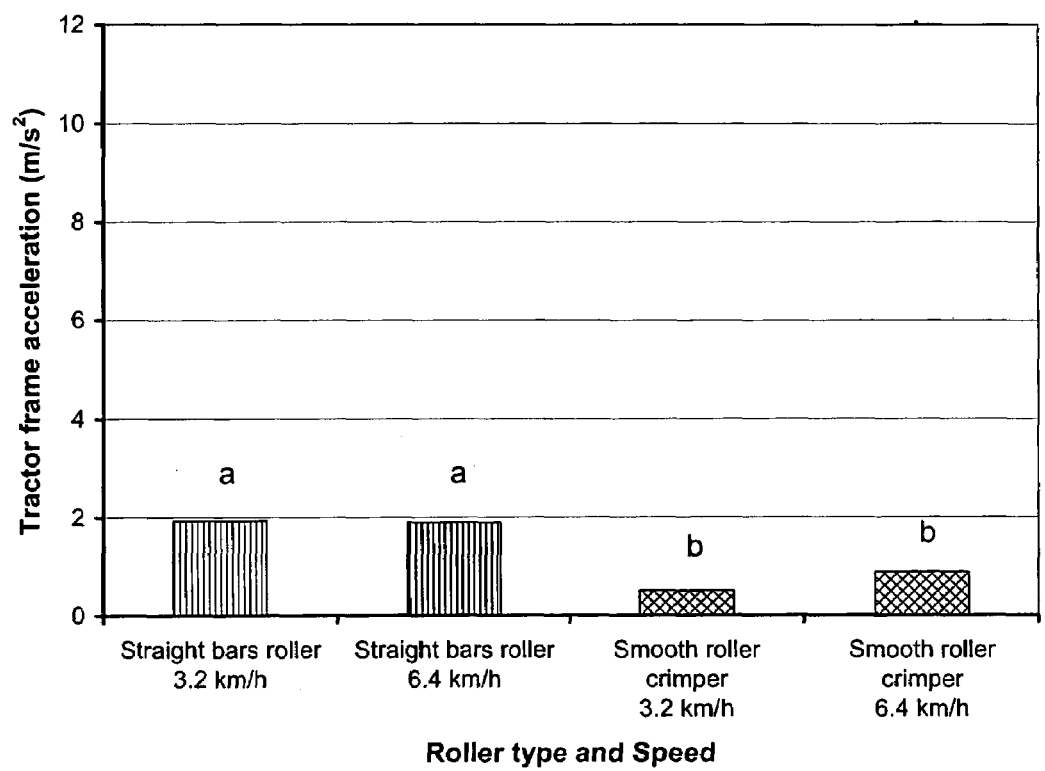
FIG. 16 is a graph showing vibration levels measured on a tractor's frame for a roller system with straight bars and System 10 of the present invention at speeds of 3.2 km/hour or 6.4 km/hour. Similar letters indicate no significant differences between treatments ($\alpha \leq 0.1$).

The commercial-size rollers (about 4.1 m wide) weighed at least 3-times more (1400 kg) than the experimental single-section rollers. With increased operating speeds, even though triple section rollers generated similar vibration levels as single section rollers, it would be expected that the resulting forces transferred to the tractor and operator would be much higher in magnitude due to the increased weight and could cause possible machine failure and increased discomfort or even injury to the operator. Roller frame vibrations and vibrations transferred to the tractor from each type of roller were compared as described above in Example 1. Vibration levels produced by the two different roller systems, and measured on the roller's frame were not significantly different at the same operating speed (FIG. 15). The roller with straight crimping bars generated about 6.47 m/sec² and system 10 of the present invention about 4.66 m/sec² at about 3.2 km/h (LSD=3.2). With increased operating speed to about 6.4 km/h, vibration levels significantly increased for both rollers to about 14.4 m/sec² and for smooth roller with the oscillating bar to about 15.86 m/sec² (LSD=3.2) (FIG. 15). Vibration levels transferred by the rollers to the tractor's frame differed significantly among roller types (FIG. 16). The increase in operating speed did not increase significantly tractor's frame vibration levels generated by each roller type (LSD=0.60).

System 10 of the present invention transferred significantly lower vibration levels: about 0.5 m/sec² and about 0.88 m/sec² at about 3.2 and about 6.4 km/h, respectively, to the tractor's frame as compared with straight bars roller. As in example 1, it appears that three-section system 10 of the present invention transferred most of its energy to the cover crop, thus minimizing vibration transferred to the tractor's frame. This vibration level was below the "extremely uncomfortable limit" as determined by ISO2631-1 standard issued by the International Standard Organization (1997). Straight bar roller generated vibration levels on tractor frame: about 1.93 m/sec² and about 1.89 m/sec² at about 3.2 and about 6.4 km/h, respectively, that exceeded "extremely uncomfortable limit" (FIG. 16)

The foregoing detailed description is for the purpose of illustration. Such detail is solely for that purpose and those skilled in the art can make variations therein without departing from the spirit and scope of the invention.

INDEX OF THE ELEMENTS

5. Soil Surface
8. Steel Plate
10. Cover Crop Termination System
11. Cylindrical Smooth Drum
12. Drum End
13. Shaft
14. Cam Mechanism
15. Cam Follower
16. Connecting Arm
18. Ball Bearing
19. Adjustable Tension Spring
20. Roller Assembly
21. Roller Frame
22. Pivot Point
23. Side Arm
25. Roller Frame Assembly
26. Roller Frame Assembly Hook
27. Crimping Arm
27a. Extension
27b. Opening
28. Slide
29. Crimping Arm Assembly Hook
30. Crimping Assembly
31. Crimping Bar
32. Crimping Arm Assembly
35. Spring Assembly
36. Compression Spring
37. Spring Housing
38. Bolts
39. Bolts
40. Cam Assembly
41. Elongated Openings
42. Linkage Arms
43. Turnbuckle
44. Linkages

We claim:

1. A crop crimping device comprising:
  a crop roller for rolling over targeted crops;
  at least one cam mechanism attached to the crop roller so that the crop roller rotates the cam mechanism;
  at least one cam follower engaging a perimeter of the cam mechanism; and,
  a crimping arm assembly attached to the cam follower so that the crimping arm assembly is raised and descends as the cam follower travels around a perimeter of the cam mechanism, the crimping arm thereby crimping the targeted crops.

2. The crimping device of claim 1 wherein the crimping arm assembly further comprises a slide and a plurality of crimping assemblies, each of the crimping assemblies comprising a crimping bar.

3. The crimping device of claim 2 wherein the crimping bar comprises an L shaped angle iron, a portion of the crimping bar comprising a blade.

4. The crimping device of claim 2 wherein each of the crimping bars is articulated so that each of the crimping bars is individually extendable and retractable.

5. The crimping device of claim 4 wherein a compression spring is disposed adjacent the crimping bar so that the crimping bar is slidably maintained in an extended position.

6. The crimping device of claim 2 wherein the slide has an inverted L shape, the crimping bar being concentric with the slide.

7. The crimping device of claim 1 wherein the crop roller has a generally cylindrical shape.

8. The crimping device of claim 7 wherein the crop roller has a smooth outer surface.

9. The crimping device of claim 1 wherein the crop roller has a first end and a second end so that an axle extends through the crop roller first and second ends.

10. The crimping device of claim 9 wherein the at least one cam mechanism comprises first and second cam mechanisms, the axle extending through the first cam mechanism disposed on the first end of the crop roller, and through the second cam mechanism disposed on the second end of the crop roller.

11. The crimping device of claim 9 further comprising a frame mechanism, the frame mechanism being rotatably connected to the axle and pivotably connected to the crimping arm assembly.

12. The crimping device of claim 11 further comprising a spring mechanism extending between the crimping arm assembly and the frame so that a downward force is directed to the crimping arm assembly.

13. The crimping device of claim 1 wherein the perimeter of the cam mechanism has a corrugated profile.

14. A system for rolling and crimping cover crops, the system comprising:
 a crop roller;
 at least one cam assembly disposed adjacent to the crop roller, the cam assembly comprising:
  (a) a cam mechanism attached to the crop roller;
  (b) a cam follower engaging a perimeter of the cam mechanism; and
  (c) a cam follower linkage having a first end and a second end, the first end being attached to the cam follower;
 a crimping arm assembly operatively associated with the cam assembly and the crop roller, the crimping arm assembly comprising:
  (a) at least one crimping arm mechanism pivotally attached to the second end of the cam follower linkage;
  (b) a slide attached to the at least one crimping arm mechanism; and
  (c) at least one crimping bar attached to the slide;
 whereby as the crop roller rolls over targeted crops, the cam mechanism causes the at least one crimping arm mechanism to oscillate so that the crimping bar crimps the targeted crops.

15. The system of claim 14 wherein the crimping arm assembly comprises a plurality of the crimping bars, each of the crimping bars has a compression means disposed between the slide and the crimping bar so that each of the crimping bars is individually extendable and retractable.

16. The system of claim 15 wherein the compression means is a spring.

17. The system of claim 14 wherein an axle extends through the crop roller and the cam mechanism so that the crop roller rotates the cam mechanism.

18. The system of claim 17 further comprising a support frame rotatably attached to the axle, a tension spring applying downwardly force between the support frame and cam follower linkage so that the crimping arm assembly is urged toward the targeted crops.

19. A method of making a crop roller, the method comprising the steps of:
 providing a crop roller for rolling over targeted crops;
 attaching a cam mechanism to the crop roller so that the crop roller rotates the cam mechanism;
 deploying a cam follower on a perimeter of the cam mechanism so that as the cam mechanism rotates, the cam follower follows the perimeter of the cam mechanism; and,
 connecting a crimping arm assembly to the cam follower so that the crimping arm assembly is raised and descends as the cam follower travels around the perimeter of the cam mechanism, the crimping arm thereby crimping the targeted crops.

20. A method of rolling and crimping a field of crops, the method comprising the steps of:
 providing a cylindrical crop roller for rolling over targeted crops;
 attaching a cam mechanism to the crop roller so that the crop roller rotates the cam mechanism thereby causing a cam follower to vertically raise and lower an attached crimping arm and associated crimping assembly, the crops being crimped when the crimping assembly is lowered;
 connecting the crop roller to a motive means; and,
 propelling the motive means across a field of the targeted crops so that the targeted crops are simultaneously flattened by the crop roller and crimped by crimping assembly.

* * * * *